(12) United States Patent
Zhang

(10) Patent No.: US 6,711,416 B1
(45) Date of Patent: Mar. 23, 2004

(54) FIXED WIRELESS COMMUNICATION SYSTEM HAVING POWER CONTROL FOR DOWNLINK DATA TRAFFIC

(76) Inventor: Hongliang Zhang, 4850 125th Ave. NE., Apt. 212, Redmond, WA (US) 98052

( * ) Notice: Subject to any disclaimer, the term of this patent is extended or adjusted under 35 U.S.C. 154(b) by 218 days.

(21) Appl. No.: 09/723,647

(22) Filed: Nov. 28, 2000

(51) Int. Cl.[7] ................................ H04Q 7/20
(52) U.S. Cl. ............... 455/522; 455/63.1; 455/127.1; 455/448
(58) Field of Search ...................... 455/63, 67.1, 522, 455/524, 448, 449–450, 63.1, 67.11, 127.1

(56) References Cited

U.S. PATENT DOCUMENTS

| | | |
|---|---|---|
| 4,613,990 A | 9/1986 | Halpern |
| 5,535,239 A | 7/1996 | Padovani et al. |
| 5,579,373 A * | 11/1996 | Jang ............... 379/59 |
| 5,629,934 A | 5/1997 | Ghosh et al. |
| 5,659,569 A | 8/1997 | Padovani et al. |
| 5,745,484 A | 4/1998 | Scott |
| 5,758,090 A | 5/1998 | Doner |
| 5,812,938 A | 9/1998 | Gilhousen et al. |
| 5,822,318 A | 10/1998 | Tiedemann, Jr. et al. |
| 5,893,036 A | 4/1999 | Trandai et al. |
| 5,914,946 A | 6/1999 | Avidor et al. |
| 5,953,311 A * | 9/1999 | Davies ............... 370/210 |
| 5,982,766 A | 11/1999 | Nystrom et al. |
| 5,995,496 A | 11/1999 | Honkasalo et al. |
| 6,002,919 A | 12/1999 | Posti |
| 6,308,072 B1 * | 10/2001 | Labedz ............... 455/448 |
| 6,445,930 B1 * | 9/2002 | Bartelme ............ 455/552 |

* cited by examiner

Primary Examiner—William Trost
Assistant Examiner—Brandon J Miller

(57) ABSTRACT

A fixed wireless communication system adjusts the downlink data transmission power based on the location of a recipient remote subscriber unit to minimize co-channel interference. The network includes a plurality of service areas, each served by a base station that transmits data to the remote subscriber units within the service area. Each remote subscriber unit is assigned to a particular group to which a respective transmission power is associated.

21 Claims, 8 Drawing Sheets

FIXED WIRELESS COMMUNICATION SYSTEM HAVING POWER CONTROL FOR DOWNLINK DATA TRAFFIC

CROSS REFERENCE TO RELATED APPLICATIONS

Not Applicable.

STATEMENT REGARDING FEDERALLY SPONSORED RESEARCH

Not Applicable.

FIELD OF THE INVENTION

The present invention relates generally to communication systems, and more particularly, to wireless communication systems.

BACKGROUND OF THE INVENTION

There are many types of communication systems for transferring data from one node to another node. One type of communication system known as a fixed wireless system includes a series of remote subscriber units having a fixed location. The remote subscriber units are associated with a cell or sector that is served by a base station. In general, each base station communicates through the air with the remote subscriber units within the cell or sector served by the base station. The wireless link from the base station to the remote subscriber units is referred to as the downlink and the link from a remote subscriber unit to its serving base station is referred to as the uplink.

To increase the data throughput of the network, conventional fixed-wireless systems typically re-use available frequency resources in a cellular manner. In such a system, however, co-channel interference due to frequency re-use becomes a significant limitation in the overall system data throughput. To reduce re-use co-channel interference, some known fixed wireless systems attempt to control the power of the signal transmitted by the base station (downlink) or by the remote subscriber units (uplink) to limit excessive transmitting power. However, typical power control algorithms are directed to continuous data traffic, such as circuit-switched voice. Due to its bursty nature, packet-based data traffic presents additional co-channel interference reduction challenges. For example, it is relatively difficult to continuously monitor the link quality and adjust the transmitting power for packet data traffic.

In addition, wireless data services such as wireless Internet, multimedia, and other wireless data communications can generate broadband packet data traffic that demands a relatively high data throughput from a wireless access network. Further, for certain applications, such as Internet browsing, a large downlink data throughput is more desirable than uplink throughput.

It would, therefore, be desirable to provide a power control technique that minimizes co-channel interference when downloading data in a bursty fixed wireless network.

SUMMARY OF THE INVENTION

The present invention provides a fixed wireless network that controls the power of signals transmitted by a base station to remote subscriber units for minimizing co-channel interference. Although the invention is primarily shown and described in conjunction with a fixed wireless communication system, it is understood that the invention is applicable to other wireless communication systems in which increasing the downlink data capacity is desired.

In one aspect of the invention, a fixed wireless communication system includes a plurality of service areas or cells, each of which is served by a base station that transmits signals to remote subscriber units within the service area. The base station transmits signals at a respective one of a plurality of power levels based upon the destination remote subscriber unit. More particularly, each remote subscriber unit is assigned to one of a plurality of groups, each having a group pathloss interval. The pathloss range for the service area is apportioned into the groups such that each group has a pathloss range within the overall pathloss range for the service area. Based upon its pathloss range, each group is associated with a particular transmit power level.

In one embodiment, the pathloss for the service area is linearly apportioned by dividing the total service area pathloss by an interval value so as to determine the number of groups in the service area. The remote subscriber units are assigned to one of the groups based upon the pathloss of the remote subscriber unit, which has a fixed location in relation to the base station.

In a further aspect of the invention, a method for controlling signal transmission power levels in a fixed wireless communication system includes determining a pathloss range for a service area and apportioning the pathloss range into groups, each having an associated pathloss range interval. The method further includes assigning remote subscriber units within the service area to one of the groups based upon the pathloss of the remote subscriber unit to the base station and assigning a transmit power level to each of the groups based upon the group pathloss interval. Data for a destination remote subscriber unit is then transmitted at a respective power level based upon the group to which the destination remote subscriber unit is assigned.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
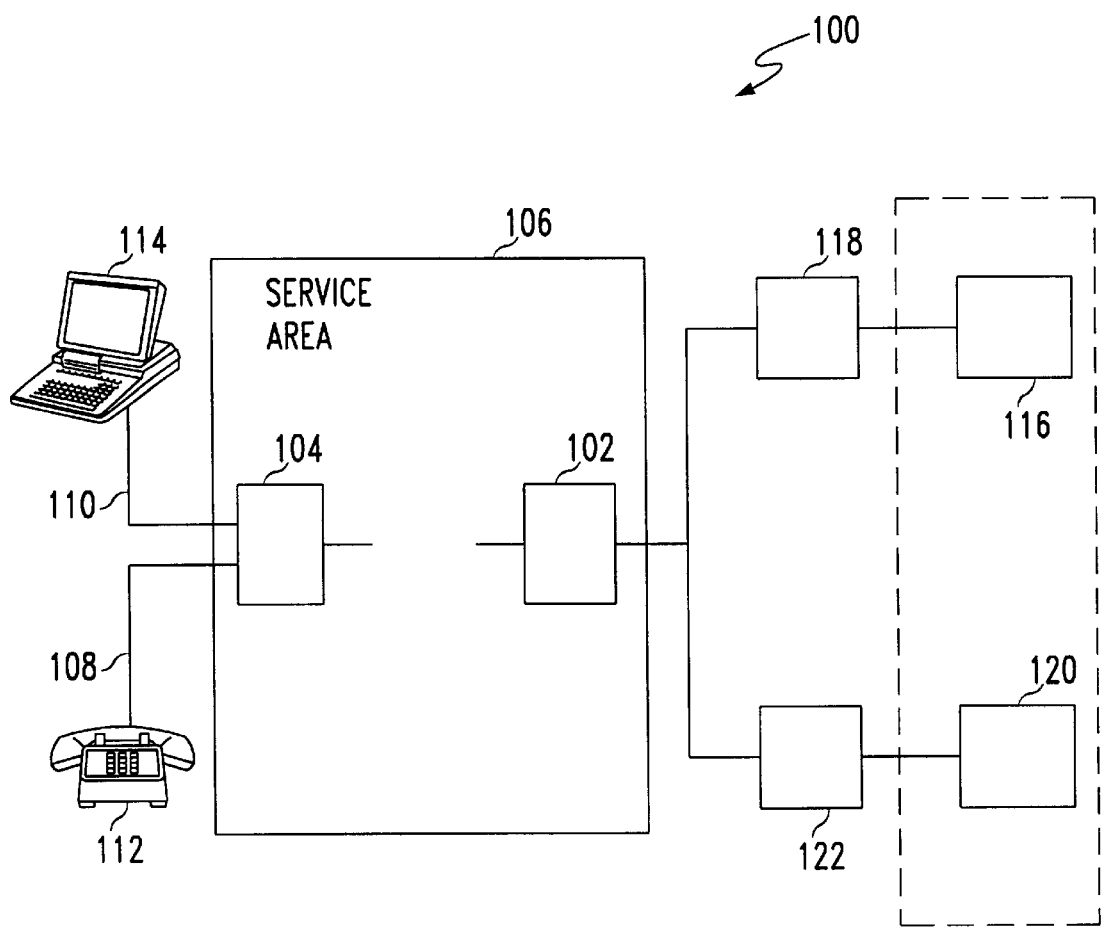
FIG. 1 is a schematic representation of a portion of a fixed wireless communication system having downlink signal power control in accordance with the present invention.
Figure 2:
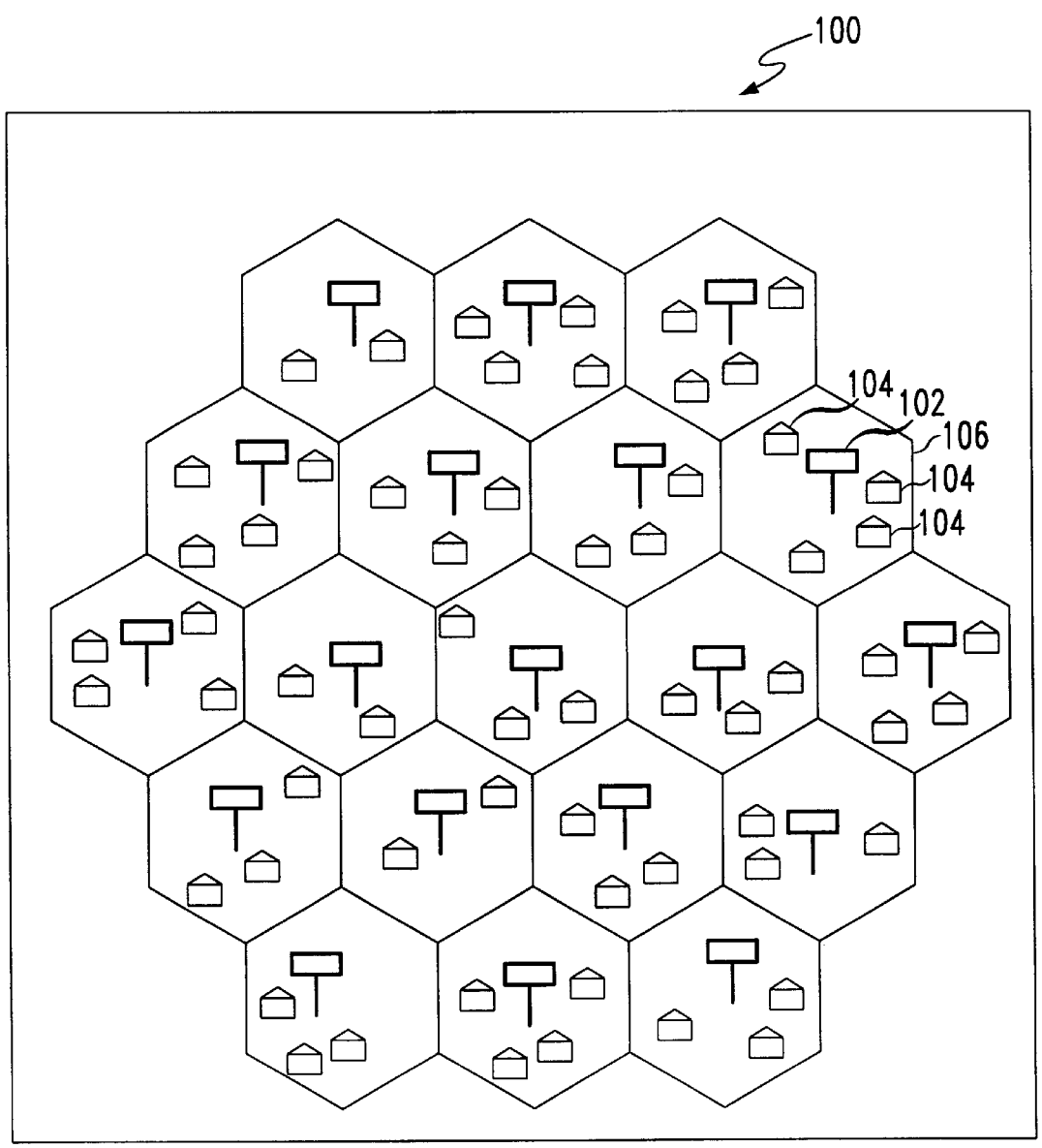
FIG. 2 is a pictorial representation of the communication system of FIG. 1 showing a plurality of cells within the network.

FIGS. 1–2 show a fixed wireless communication network 100 having downlink power control for minimizing co-channel interference in accordance with the present invention. In general, a downlink signal is transmitted at discrete power levels so as to minimize co-channel interference and enhance downlink throughput of a bursty fixed wireless network.

The network 100 includes a plurality of base stations 102, each of which communicates with remote subscriber units 104 within a cell or sector 106 served by a given base station. Each remote subscriber unit 104 has a fixed location within a respective cell or sector 106. Each base station 102 communicates with the remote subscriber units 104 within the cell served by that base station. The base station 102 and the remote subscriber units 104 send and receive data via signals transmitted through the air, e.g., wireless communication. Each remote subscriber unit 104 can provide voice 108 and data 110 signals to devices such as telephones 112 and computers 114.

The base station 102 can receive voice data traffic from a public switched telephone network (PSTN) 116 via a mobile/wireless switch center (MSC) 118 and data, e.g., Internet data, from the Internet core network (IP) 120 through a data service node (DSN) 122. As known to one of ordinary skill in the art, if the voice data is packetized, voice data can come from the DSN 122 so as to eliminate the need for the MSC 118.

For each service area or cell 106, the maximum and the minimum pathloss from the base station can be identified. A link budget based upon the maximum pathloss of the service area for downlink packet data transmission is used to determine the maximum base station 102 transmitting power. Similarly, the minimum transmitting power can be determined based upon the minimum pathloss for the service area 106. The actual pathloss from the base station 102 to each fixed remote subscriber unit 104 can be measured at the time of installation, for example.

In general, each remote subscriber unit 104 within a given cell 106 is assigned to one of N groups based upon the pathloss of the remote subscriber unit from the serving base station 102. The pathloss for the entire cell 106 is apportioned into pathloss intervals and each group is associated with a respective pathloss interval within the overall pathloss for the cell. The base station 102 for the service area 106 assigns a downlink transmitting power $P_{tx}(N)$ for each group depending upon the corresponding pathloss interval of the group. It is understood that as the pathloss increases, a larger signal transmission power level is required for effective communication. For example, for ten groups (N=10), $P_{tx}(1)$, $P_{tx}(2)$, $P_{tx}(3)$, ..., $P_{tx}(10)$ correspond to the signal transmission power of the ten groups, $G_1$, $G_2$, $G_3$, ... $G_{10}$, respectively. That is, if remote subscriber unit i ($RU_i$) is associated with group eight $G_8$, then the base station downlink transmitting power for $RU_i$ is $P_{tx}(8)$ when there is downlink data traffic to be transmitted for $RU_i$.

In one embodiment, the number of groups N within a given cell 106 is derived from the maximum and minimum pathloss in the cell and an interval that defines the group by pathloss interval. More particularly, each cell has a pathloss PL between the maximum and minimum pathloss, e.g., $PL_{min} \leq PL \leq PL_{max}$. The pathloss range R for a given service area or cell is the difference between the maximum and minimum pathlosses, e.g., $R = PL_{max} - PL_{min}$ (in dB). For a given pathloss range R, the number of groups N corresponds to the cell pathloss range R divided by the group pathloss interval size $\Delta$ (in dB) of each group, e.g., $$N = \left\lfloor \frac{R}{\Delta} \right\rfloor \left\lfloor \frac{PL_{max} - PL_{min}}{\Delta} \right\rfloor.$$

It is understood that the operator $\lfloor \ \rfloor$ gives the smallest integer larger than the real value of the argument.

For a given group interval size $\Delta$, the pathloss range for each of N groups, e.g., $G_1, G_2, \ldots G_N$, respectively, can be defined as $\{PL_{max}, PL_{max}-\Delta\}$, $\{PL_{max}-\Delta, PL_{max}-2\Delta\}$, ... $\{PL_{max}-(N-1)\Delta, PL_{min}\}$. Each remote subscriber unit has an associated pathloss $PL_{RUi}$ within its service area from which the remote subscriber unit can be assigned to the group in which the unit pathloss falls. For example, a cell 106 with a maximum pathloss $PL_{max}$ of 140 dB and a minimum pathloss $PL_{min}$ of 70 dB has a pathloss range $R = PL_{max} - PL_{min} = 70$ dB. For a group interval size $\Delta$ of 10 dB, the cell has seven groups, i.e, $N = R/\Delta = 70$ dB/10 dB=7. Assuming a pathloss PL of 105 dB for a given remote subscriber unit 104, that remote subscriber unit falls within the fourth group $G_4$, which has a pathloss range of $\{140-3(10), 140-4(10)\}$, i.e., 110 to 100 dB.

Thus, each remote subscriber unit 104 within a cell or sector 106 can be assigned to a respective one of the N groups. The base station 102 transmitting powers $P_1$, $P_2$, $P_3$, ... $P_N$ designate the respective downlink signal power for each group $G_1, G_2, G_3, \ldots G_N$, respectively. As the group pathloss increases, the associated signal transmission power also increases. As described above, each remote subscriber 104 can be assigned to a particular group based upon the remote subscriber unit pathloss from the base station. For example, group $G_1$ includes $RU_1, RU_2, RU_3, \ldots, RU_{n1}$. Group $G_2$ includes $RU_{n1+1}, RU_{n1+2}, \ldots, RU_{n2}$ and group $G_N$ includes $RU_{n(n-1)+1}, \ldots, RU_M$, where M represents the total number of remote subscriber units 104 in a service area 106 as set forth below in Table 1.

TABLE 1

| Group | Group Index | BS Tx Power | Pathloss | RUs |
| --- | --- | --- | --- | --- |
| G1 | 1 | P1 | $(PL_{max}, PL_{max} - \Delta)$ | $RU_1, RU_2, \ldots RU_{n1}$ |
| G2 | 2 | P2 | $(PL_{max} - \Delta, PL_{max} - 2\Delta)$ | $RU_{n1+1}, \ldots RU_{n2}$ |
| G3 | 3 | P3 | $(PL_{max} - 2\Delta, PL_{max} - 3\Delta)$ | $RU_{n2+1}, \ldots RU_{n2}$ |
| G4 | 4 | P4 | $(PL_{max} - 3\Delta, PL_{max} - 4\Delta)$ | $RU_{n3+1}, \ldots RU_{n2}$ |
| ... | ... | ... | ... | |
| Gn | N | PN | $(PL_{max} - (N-1)\Delta, PL_{min})$ | $RU_{n(N-1)+1}, \ldots RU_M$ |

In one embodiment, Table 1 can form the basis for a lookup table used by the base station to determine the power level of the downlink signal to a given remote subscriber unit based upon its group association.

Figure 3:
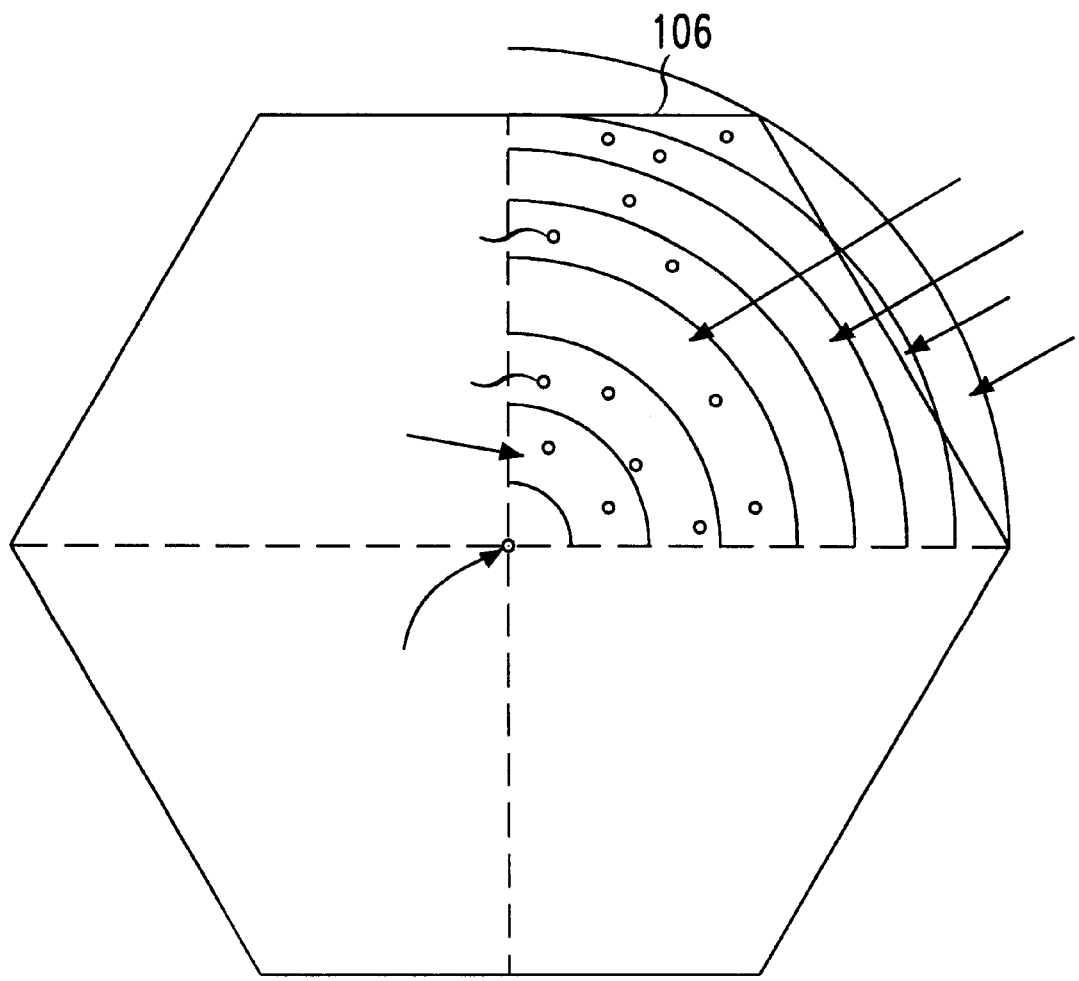
FIG. 3 is a schematic representation of power control levels within a cell of the communication system of FIG. 1.

FIG. 3 shows groups G1–N within a ninety degree sector of a cell 106 served by a base station BS. Each remote subscriber unit RU within the sector is assigned to a particular group $G_i$ based upon the pathloss of the remote subscriber RU to the base station BS. The base station BS determines the recipient remote subscriber unit RU of incoming data and transmits the downlink signal at a signal level corresponding to the group to which the recipient remote subscriber unit RU is assigned.

It is understood that the selection of the number of groups N can be based upon a variety of factors including pathloss, transmitter characteristics, number of remote subscriber units, desired power control resolution, and remote subscriber receiver characteristics. It is further understood that the number of groups N and the interval size $\Delta$ can be selected independently.

While the embodiment described above apportions the cell pathloss in a linear manner to define the groups in the cell, it will be readily apparent to one of ordinary skill in the art that the pathloss intervals can be defined using linear and non-linear techniques.

Figure 4:
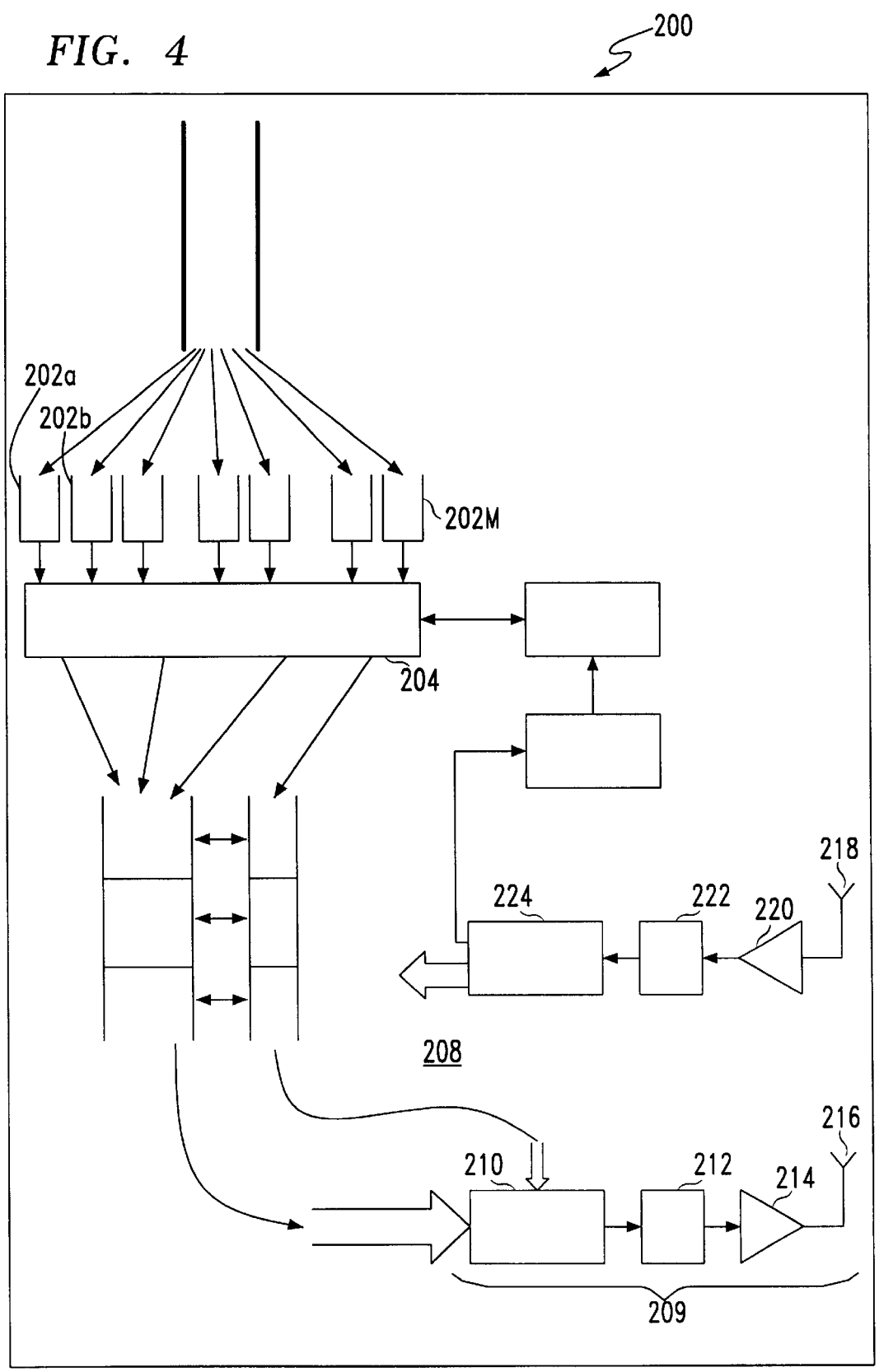
FIG. 4 is a block diagram showing an exemplary embodiment of downlink data scheduling within a cell of the network of FIG. 1.

FIG. 4 shows an exemplary embodiment of a data traffic scheduling system 200 that can form part of a base station BS for controlling signal transmission power in accordance with the present invention. The scheduling system 200 receives data from a DSN (not shown) and distributes the data into bins 202a–202M based upon address information contained in the data packet header. In one embodiment, the scheduling system has M bins for holding respective data for M remote subscriber units RUs within the service area.

The scheduling system 200 includes a Data Traffic Scheduling Entity (DTSE) 204 for controlling data transmission from the bins 202. DTSE devices are well known to one of ordinary skill in the art. In general, the DTSE 204 determines how the data in the data bins should be transmitted, in what order, and what amount of data is to be transmitted at one time. The scheduled data is then pushed to a buffer 206 for ultimate transmission by the physical layer 208. Based upon the group assigned to the particular remote subscriber unit RU, a transmission power level is associated with the data in the buffer 206 for each recipient remote subscriber unit.

In one embodiment, the DTSE 204 schedules data transmission from each of the RU data bins 202 consecutively from $RU_1$ through $RU_M$ or from $RU_M$ through $RU_1$, e.g., round robin. If there is no data in a respective RU data bin, the bin will be skipped. Each time the pre-set amount or less of the data from a bin 202 is taken for transmission. It is understood that alternative scheduling patterns known to one of ordinary skill in the art can be used.

In one embodiment, the scheduling system 200 includes a lookup table, such as Table 1 above, for storing the base station transmitting power and group index for each remote subscriber unit RU. Alternatively, the base station transmitting power or group index for each remote subscriber unit RU can be associated with its corresponding data bin. While scheduling data to be transmitted from the data bins 202, the DTSE 204 follows the same order to schedule corresponding base station transmitting powers for the remote subscriber units RUs from a pre-built lookup table. A sequence of ordered base station transmitting powers is then formed to parallel that of the ordered data to be transmitted.

In general, the base station physical layer 208 is responsible for transmitting and receiving information and control data traffic between the base station and remote subscriber units. The physical layer 208 can be part of the Open System Interconnect (OSI) architecture. In one embodiment, the physical layer 208 is based on an Orthogonal Frequency Division Multiplexed (OFDM) waveform including multiple frequency domain channels and multiple time domain slots per frequency channel. OFDM based systems are well known to one of ordinary skill in the art. Transmissions between a base station and the remote subscriber units are carried out in a Frequency Division Duplex (FDD) manner with 80 MHz, for example, of separation between downlink and uplink transmissions.

The physical layer includes a transmitting system 209 at the base station. The transmitting system 209 transmits downlink data traffic at the base station to the remote subscriber units. If power control is not enabled, the transmitting system 209 transmits the bit sequences in the data buffer, after digital to analog conversion, with a pre-set transmitting power to remote subscriber units RUs in the service area. If power control is enabled at the base station for downlink data transmission, the physical layer 208 adjusts its transmitting power based upon the destination remote subscriber unit, as described above. If the power level is given in the form of group index, the physical layer 208 adjusts the power level to the corresponding value of the group index. Alternatively, the physical layer adjusts the power setting to the value in the buffer 206.

In one embodiment, the transmitting system 209 includes a transmitter (Tx) subsystem 210 that receives buffered binary data, encodes the data, and maps the encoded data into multi-amplitude, multi-phase constellation symbols scaled by the transmission power setting associated with the data to be transmitted.

In one particular embodiment, the multi-amplitude multi-phase constellation symbols include sixteen quadrature amplitude modulation (16 QAM) or quadrature phase shift keying (QPSK) symbols. The subsystem 210 utilizes orthogonal frequency division multiplexing (OFDM) transmission techniques. After digital to analog signal conversion by D/A 212 and conventional lowpass filtering, the physical layer then amplifies the analog signal with a power amplifier 214 and transmits the amplified signal through an antenna 216 in a manner well known to one of ordinary skill in the art.

The data traffic scheduling system 200 can further include a conventional antenna 218, amplifier 220, analog to digital converter 222, and receive subsystem 224 for receiving transmission performance data from the remote subscriber units. The transmission performance data can be used for the re-assignment of remote subscriber units RUs from one group to another group. Such a group re-assignment can be performed from time to time as pathloss, co-channel interference, and channel conditions vary.

Figure 5:
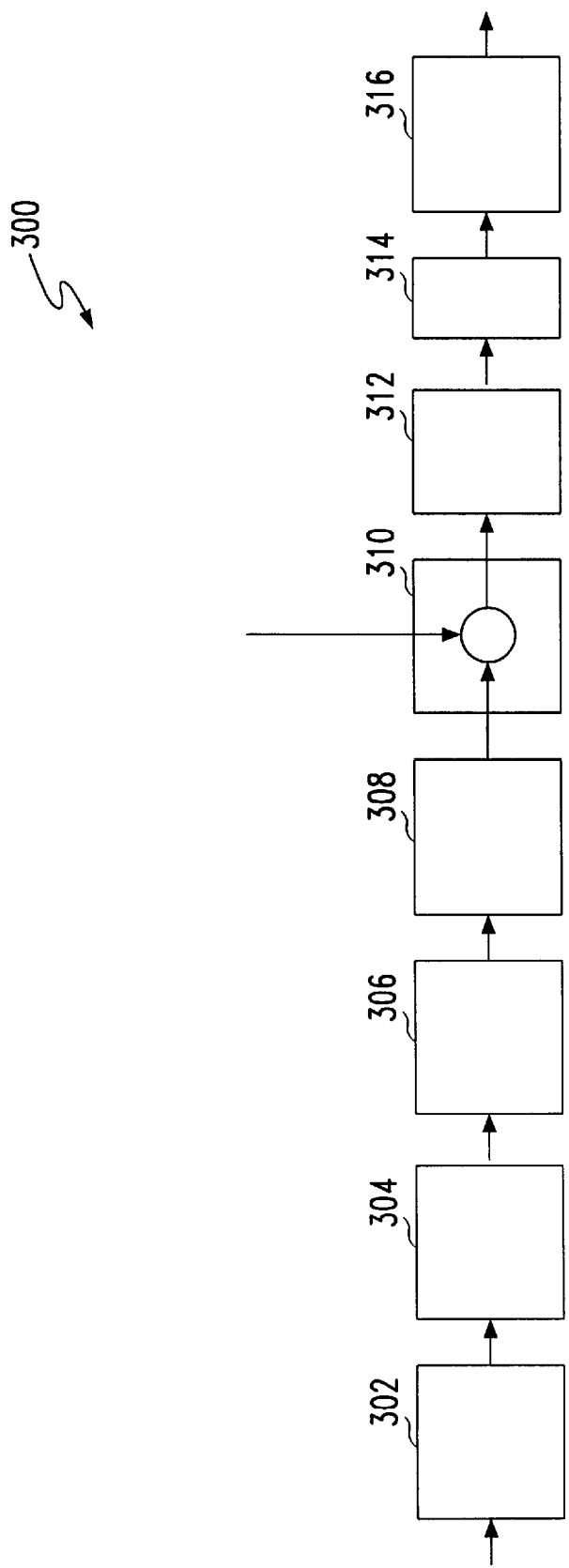
FIG. 5 is a block diagram of an exemplary transmit system for an OFDM system having transmit power control in accordance with the present invention.

FIG. 5 shows an exemplary transmit (Tx) subsystem 300, which can correspond to the transmit subsystem 210 of FIG. 4, having transmission power control in accordance with the present invention. A channel encoder 302 encodes, such as by using a Reed-Solomon (RS) code, data bits from a buffer, which can correspond to the buffer 206 shown in FIG. 4. A scrambler 304 scrambles the encoded bits to prevent the occurrence of a long sequence of ones or zeroes. A signal mapper 306 maps the encoded/scrambled bits into multi-amplitude multi-phase constellation symbols. In one particular embodiment, the multi-amplitude multi-phase constellation symbols include sixteen quadrature amplitude modulation (16 QAM) or quadrature phase shift keying (QPSK) symbols. Pilot signals are then inserted by a pilot inserter 308 to estimate the channel at the remote subscriber unit receivers. A symbol scaler 310 adjusts the base station transmitting power by scaling modulation constellation symbols for downlink data transmission. More particularly, a symbol scaling factor L, which is described below, adjusts the transmission power. In one embodiment, the symbol scaling factor L is provided from a buffer, such as the buffer 206 of FIG. 4.

The serial, scaled signal symbol stream is converted to parallel data streams by a serial-to-parallel (S/P) converter 312 for modulating a predetermined number of sub-carriers or frequency tones by Inverse Fast Fourier Transform (IFFT) 314. The output signal of the IFFT 314 is a time-domain 16 QAM or QPSK modulated OFDM signal. Cyclic prefix data is inserted by the cyclic prefix inserter 316 to reduce the inter-symbol-interference due to channel delay spread. The resulting time domain data samples are then provided to a D/A converter.

Figure 5A:
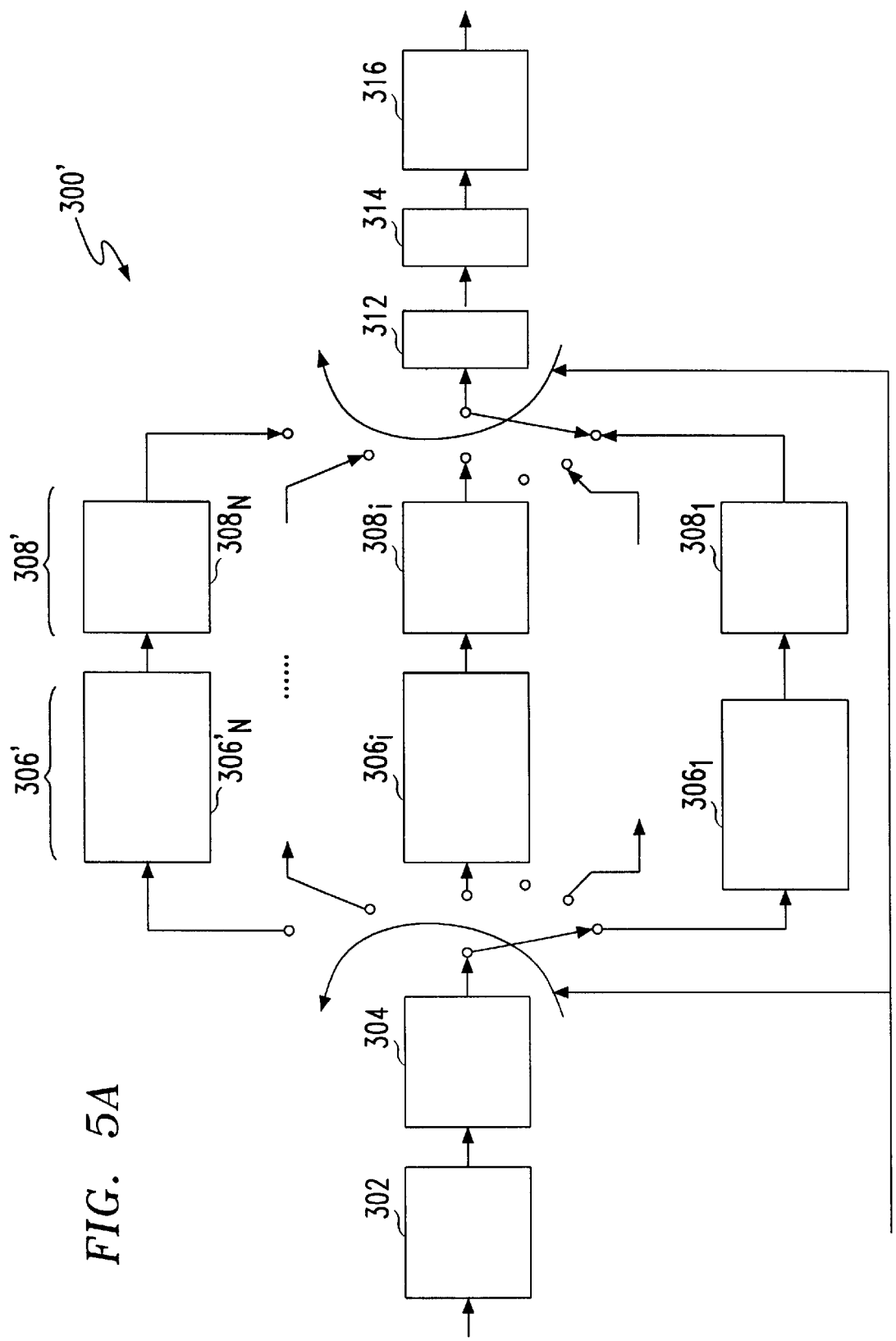
FIG. 5A is a block diagram of an alternative transmit system for an OFDM system having transmit power control in accordance with the present invention.

FIG. 5A shows an alternative Tx subsystem 300' providing power control in accordance with the present invention in which like reference numbers indicate like elements. The modulation constellation scale factor, i.e., $L_i$, i=1,2, ..., N, corresponds to the group $G_i$ (or power setting $P_{tx}(i)$) from the buffer. In general, the group index $G_i$ determines a signal path through corresponding mappers 306' and pilot inserters. Respective pairs of mappers and pilot inserters correspond to a predetermined scaling factor L associated with the group (or transmitting power Ptx(I)).

Figure 6:
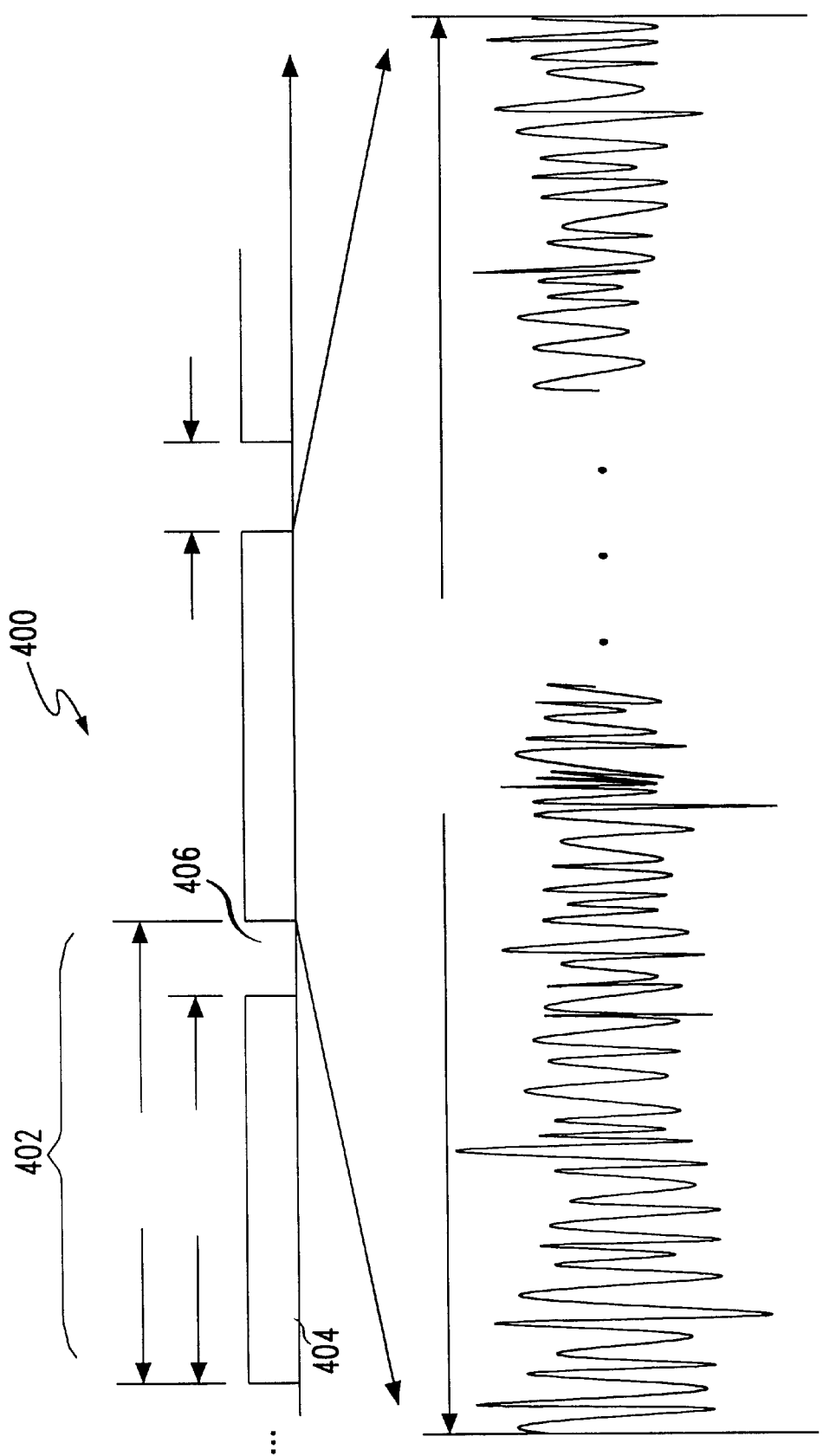
FIG. 6 is a pictorial representation of an exemplary signal format that can be generated by the OFDM system of FIG. 5.
Figure 7:
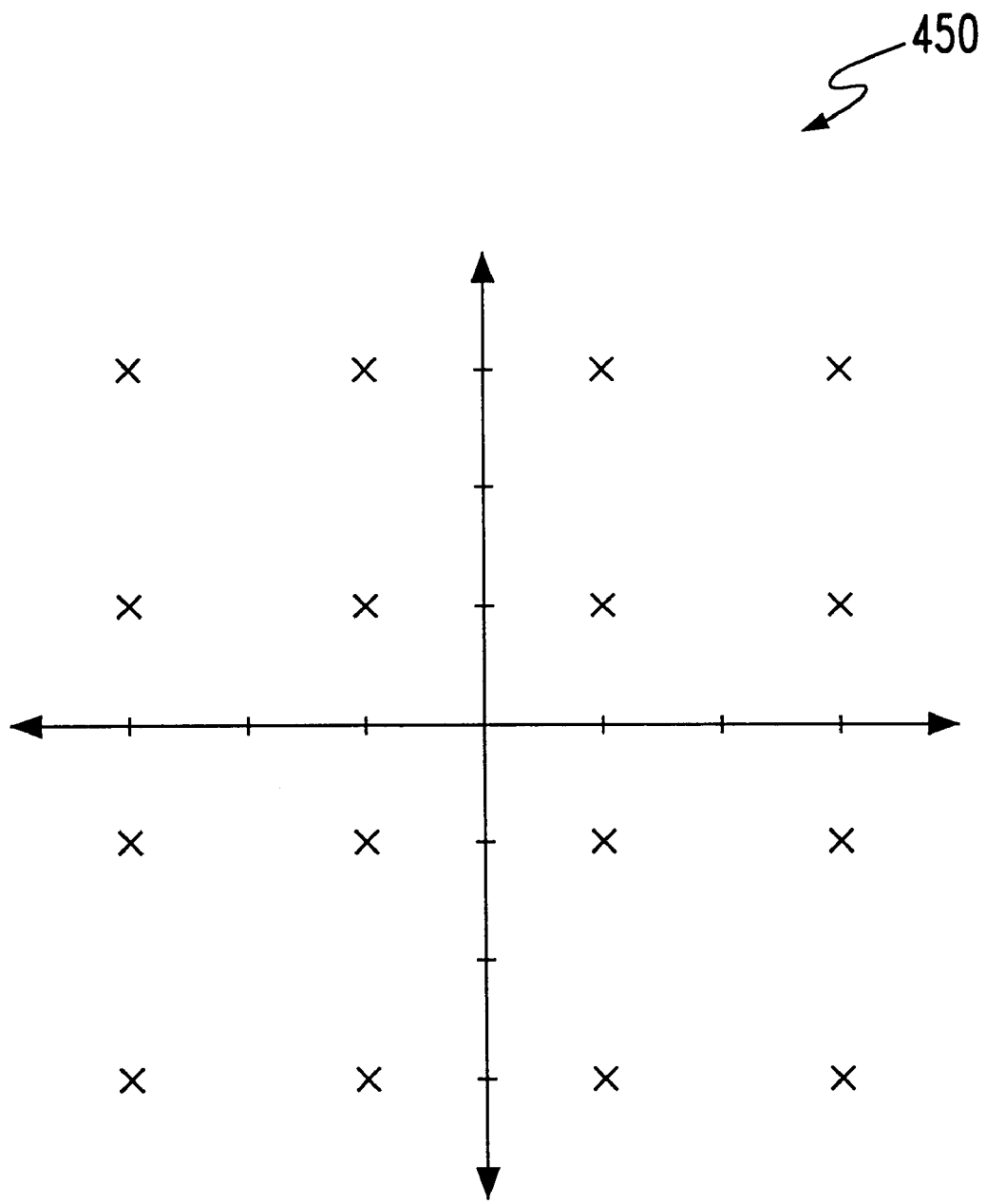
FIG. 7 is a graphical representation of constellation samples that can be formed by the OFDM system of FIG. 5.

FIG. 6 shows an exemplary OFDM signal format 400. In each time slot 402, there is a transmission burst 404 and a guard time 406. Data is transmitted in each burst using multiple sub-carriers (or tones). In one particular embodiment, the burst duration is 320 μs with a guard period of duration 55 μs inserted after each burst. The time slot is 375 μs. FIG. 7 shows an exemplary 16 QAM constellation pattern 450.

In one embodiment, power control in accordance with the present invention for an OFDM system is implemented by adjusting the modulation symbol constellation scale. In an X-Y coordination plane, such as that shown in FIG. 7, a modulation constellation point is specified by x, y coordinates. The x and y coordinates can take values of {+/-1d, +/-3d, +/-5d, +/-7d, ..., } where "d" can be any value larger than zero and is typically one. For a 16 QAM symbol constellation (FIG. 7) at coordinates x=(+/-1d, +/-3d), and y=(+/-1d, +/-3d) the 16 constellation points of the 16 QAM are {1d,1d}, {1d,3d}, {3d,3d}, {3d,1d}, {1d,-1d}, {1d,-3d}, {3d,-1d}, {3d,-3d}, {-1d,1d}, {-1d,3d}, {-3d, 1d}, {-3d,3d}, {-1d,-1d}, {-1d,-3d}, {-3d,-1d}, and {-3d,-3d}. Similarly, the constellation points for a QPSK modulation are {1d,1d}, {1d,-1d}, {-1d,1d}, and {-1d,-1d}.

When there is binary data to be transmitted, one or more modulation symbols (i.e., constellation points) are used to carry the data. In the case where each symbol in a modulation constellation has the same probability of use, then the average power of each constellation symbol of the 16 QAM is $10d^2$. More particularly, the average energy of the constellation symbol can be expressed as S=(x, y) is $E(|S|^2)$, where E( ) denotes expectation (statistical or ensemble averaging). For a given constellation symbol S=(x, y), the energy can be expressed as $E_s=|S|^2=x^2+y^2$. The 16 QAM has 16 constellation symbols having respective energies, i.e., $2d^2$, $10d^2$, $18d^2$, $10d^2$, $2d^2$, $10d^2$, $10d^2$, $18d^2$, $2d^2$, $10d^2$, $10d^2$, $18d^2$, $2d^2$, $10d^2$, $10d^2$, $18d^2$. In the case where each symbol in a modulation constellation has the same probability of use, the probability of use is 1/16 for a 16 QAM symbol and the average energy per symbol is:

$$E(|S|^2)=(2d^2+10d^2+18d^2+10d^2+2d^2+10d^2+10d^2+18d^2+2d^2+10d^2+10d^2+18d^2+2d^2+10d^2+10d^2+18d^2)/16=10d^2.$$

A normalized 16 QAM constellation can be obtained by dividing each symbol (x, y) with the square root of the average power, $10d^2$. The resulting normalized constellation points are {0.3162,0.3162}, {0.3162,0.9487}, {0.9487, 0.9487}, {0.9487,0.3162}, {0.3162,-0.3162}, {0.3162,-0.9487}, {0.9487,-0.3162}, {0.9487,-0.9487}, {-0.3162, 0.3162}, {-0.3162,0.9487}, {-0.9487,0.3162}, {-0.9487, 0.9487}, {-0.3162,-0.3162}, {-0.3162,-0.9487}, {-0.9487,-0.3162}, and {-0.9487,-0.9487}.

The normalized modulation constellation can then be scaled by multiplying each symbol with a coefficient or scaling factor or level L, as shown in FIG. 5. As described above, the maximum power is assigned to the first group $G_1$. Therefore, when there is data to be transmitted to any remote subscriber unit in the first group $G_1$, the modulation symbol constellation will be scaled by $L_1$. Similarly, when there is data to be transmitted to any remote subscriber unit in the second group $G_2$, the modulation symbol constellation will be scaled by $L_2$. If there is data to be transmitted to any remote subscriber unit in the ith group $G_i$, the modulation symbol constellation will be scaled by $L_i$. The constellation scaling level, $L_1$, $L_2$, ..., $L_N$, corresponds to transmitting powers of $P_{tx}(1)$, $P_{tx}(2)$, $P_{tx}(3)$, ..., $P_{tx}(N)$ for groups $G_1$, $G_2$, $G_3$, ... $G_N$.

Referring again to FIGS. 4 and 5, to adjust the base station transmitting power by scaling modulation constellation symbols for downlink transmission, the transmitting system 209 is calibrated such that the gain $G_{tx}$ (in dB) from the input of IFFT block 314 to the output of the antenna 216 is equal to the maximum transmitting power, i.e., $G_{tx}=P_{tx}(1)$. In this case, the average energy of a modulation symbol, S, to be transmitted at the output of the antenna 216 can be represented as $E_{ave}=E[|(S*L_i*G_{tx})|^2]=(L_i)^2(G_{tx})^2E(|S|^2)$, where, $L_i$, i=1,2, ..., N, is the constellation scaling level. Or as expressed in dBs, $E_{ave}$ (dB)=$10\log_{10}[(L_i)^2(G_{tx})^2 E(|S|^2)]=L_i$ (dB)+$G_{tx}$(dB)+$10\log_{10}(E(|S|^2))$. Replacing the gain $G_{tx}$ with the power $P_{tx}(1)$ provides $E_{ave}$ (dB)=$L_i$ (dB)+$P_{tx}(1)$ (dB)+ $10\log_{10}(E(|S|^2))$. For a normalized modulation constellation, $E(|S|^2)=1$ and $10\log_{10}(E(|S|^2))=0$ and $E_{ave}$ (dB)=$L_i$ (dB)+$P_{tx}$ (1) (dB).

Thus, the average power (energy) of symbols to be transmitted can be adjusted by setting the constellation scaling level, $L_i$. For example, for $L_i=1$, $E_{ave}=P_{tx}(1)$. If $L_i=0.5$ or -6 dB, $E_{ave}=P_{tx}(1)-6$ (dB). As a result, the constellation scaling level corresponding to a given group can be determined based on the downlink transmitting power assigned to the group. For example, if $P_{tx}(2)=P_{tx}(1)-6$ dB, then $L_2=0.5$.

In the transmitting subsystem 300 shown in FIG. 5, the mapper 306 uses the normalized constellation, i.e., $L_1=1$. In the embodiment of the Tx subsystem 300' of FIG. 5A, $L_1=1$ and the constellation scaled by $L_1$ is the normalized constellation. For the 16 QAM, the constellation points scaled by $L_2=0.5$ are {0.1581,0.1581}, {0.1581,0.4743}, {0.4743, 0.4743}, {0.4743,0.1581}, {0.1581,-0.1581}, {0.1581,-0.4743}, {0.4743,-0.1581}, {0.4743,-0.4743}, {-0.1581, 0.1581}, {-0.1581,0.4743}, {-0.4743,0.1581}, {-0.4743, 0.4743}, {-0.1581,-0.1581}, {-0.1581,-0.4743}, {-0.4743,-0.1581}, and {-0.4743,-0.4743}. Thus, the resulting base station transmitting power for any remote subscriber unit in the second group $G_2$ is less than any remote subscriber unit in the first group $G_1$ by 6 dB.

In order to adjust the base station transmitting power by scaling modulation constellation symbols for downlink data transmission, the physical layer 208 is calibrated to have the maximum transmitting power for a modulation symbol constellation having the average power of 1 or 0 dB. That is, when the normalized constellation is used or the constellation scaling level is one (L=1), the maximum power is used as the base station transmitting power for downlink data transmission.

In general, the number of scaling levels $L_{1-N}$ should be the same as the number of RU groups. The scales can be labeled as the same as the RU group index. For example, for ten (N=10) groups $G_1, G_2, G_3, \ldots G_{10}$, the respective signal transmission powers are $P_{tx}(1), P_{tx}(2), P_{tx}(3), \ldots, P_{tx}(10)$. The modulation symbol constellation scales are denoted as $L_1, L_2, L_3, \ldots, L_{10}$ and correspond to respective signal transmission powers $P_{tx}(1), P_{tx}(2), P_{tx}(3), \ldots, P_{tx}(10)$. Thus, the DTSE 204 can schedule corresponding base station transmitting powers using the group index for the remote subscriber units RUs from a lookup table. After receiving the transmitting power setting index from the DTSE 204 buffer, the physical layer subsystem 210 (FIG. 4) scales the modulation constellation symbol using indexed scale factor $L_i$, as shown in FIG. 5A. That is, the first scale factor $L_1$ is used for the first group $G_1$, the second scaling factor $L_2$ is used for the second group $G_2$, etc.

To optimize power transmission levels, a variety of adaptive techniques for updating the power level lookup table can be utilized. Exemplary techniques include packet Automatic-Repeat-Request (ARQ) rate, data packet transmission acknowledgements, and block-error-rate (BLER). It will be readily apparent that further adaptive techniques of varying complexity for updating the lookup table can be utilized based upon the requirements of a particular system implementation.

For example, in the case where ARQ is enabled, acknowledgments are sent back to the transmitter for each frame or number of frames to confirm a transmission. In addition, a time-out mechanism can detect error conditions. If the number of re-transmissions required in a period of time is greater than a predetermined threshold, a remote subscriber unit RU can be re-assigned to the group having the next higher transmission power. If no group is left for a RU to be re-assigned, a remote subscriber unit RU can remain in its current group.

In the case where the number of required re-transmissions in a relatively long period of time is less than a predetermined amount, a remote subscriber unit can be re-assigned to the group having the next lower transmission power.

Alternatively, a moving average BLER can be used to evaluate the transmission power setting, i.e., group assignment, of a particular remote subscriber unit RU. The moving average BLER can be provided to the base station, which can update the lookup table based upon the BLER information.

One skilled in the art will appreciate further features and advantages of the invention based on the above-described embodiments. Accordingly, the invention is not to be limited by what has been particularly shown and described, except as indicated by the appended claims.

What is claimed is:

1. A method for controlling a signal transmission power level from a base station to remote subscriber units in a fixed wireless communication system, the method comprising:

determining a pathloss range for a service area;

apportioning the pathloss range into a plurality of intervals;

assigning each of a plurality of groups to a respective one of the plurality of pathloss intervals;

assigning each one of a plurality of remote subscriber units to a respective one of the plurality of groups based upon a pathloss from a base station to the remote subscriber units;

assigning a signal transmit power level to each of the plurality of groups; and adjusting a transmit power level of a signal transmitted by the base station to a destination remote subscriber unit based upon a power level associated with the group to which the destination remote subscriber unit is assigned.

2. The method according to claim 1, wherein determining the pathloss range for the service area further includes determining a difference between a maximum pathloss for the service area and a minimum pathloss for the service area.

3. The method according to claim 2, wherein apportioning the pathloss range into a plurality of groups further includes dividing the pathloss range by a predetermined group pathloss range interval.

4. The method according to claim 1, wherein apportioning the pathloss range into a plurality of groups further includes selecting a desired number of groups each having a corresponding pathloss range interval.

5. The method according to claim 1, wherein apportioning the pathloss range into pathloss intervals further includes linearly apportioning the pathloss range.

6. The method according to claim 1, further including receiving data to be transmitted by the base station and placing the received data in respective bins corresponding to the destination remote subscriber unit.

7. The method according to claim 6, further including assigning a respective transmit power level to the bins.

8. The method according to claim 1, further including re-assigning a remote subscribe unit to a respective group based upon a number of errors in data received by the destination remote subscriber unit.

9. The method according to claim 1, further including determining scaling factors for symbol constellation points in an OFDM system.

10. The method according to claim 9, wherein the scaling factors are derived from the signal transmit power associated with the groups.

11. A method for reducing co-channel interference in a fixed wireless communication system, comprising:

determining a respective area pathloss range for a plurality of service areas;

apportioning the area pathloss range for each service area into a plurality of pathloss intervals;

assigning each of a plurality of groups to a respective one of the plurality of pathloss intervals;

assigning each of a plurality of fixed remote subscriber units within a respective service area to one of the groups based upon a pathloss range from a base station to the remote subscriber unit;

assigning a respective transmit power level to each group based upon the group pathloss range; and selecting a transmit power level for data to be transmitted to a destination remote subscriber unit based upon the group to which the destination remote subscriber unit is assigned.

12. The method according to claim 11, wherein the pathloss range corresponds to a difference between a maximum pathloss for the service area and a minimum pathloss for the service area.

13. The method according to claim 11, wherein the group pathloss range corresponds to the pathloss range for the service area divided by a selected group interval size.

14. The method according to claim 11, further including adaptively re-assigning a respective one of the remote subscriber units.

15. The method according to claim 11, further including assigning a respective constellation scaling level to each of the transmit power levels.

16. A fixed wireless communication system, comprising:
- a base station for communicating with a plurality of remote subscriber units located within a service area having a predetermined pathloss range apportioned into a plurality of pathloss intervals;
- a plurality of groups assigned to respective ones of the plurality of pathloss intervals and respective ones of the plurality of remote subscriber units being assigned to respective ones of the plurality of groups based upon a pathloss from the base station to each of the plurality of remote subscriber units;
- a signal transmit power level being assigned to each of the plurality of groups, wherein the base station transmits data to a destination remote subscriber unit of the plurality of remote subscriber units at a power level assigned to a predetermined group of the plurality of groups to which the destination remote subscriber unit of the plurality of remote subscriber units is assigned.

17. The system according to claim 16, wherein the base station includes a data traffic scheduling entity for receiving data to be transmitted to the remote subscriber units, the data traffic scheduling entity including a plurality of bins each corresponding to a respective remote subscriber unit.

18. The system according to claim 17, wherein the data traffic scheduling entity further includes a lookup table for associating a respective transmit power level with data to be transmitted to the remote subscriber units.

19. The system according to claim 16, wherein the system is an OFDM system.

20. The system according to claim 16, wherein constellation symbols are scaled by respective scaling factors.

21. A method for controlling a signal transmission power level from a fixed base station to a plurality of fixed remote subscriber units in a wireless communication system, the method comprising:
- determining a pathloss range for a service area serviced by the fixed base station and the plurality of fixed remote subscriber units;
- measuring pathloss from the fixed base station to each one of the plurality of fixed remote subscriber units;
- apportioning the pathloss range for the service area into a plurality of pathloss intervals;
- assigning each of a plurality of group designations to a respective one of the plurality of pathloss intervals;
- assigning each one of the plurality of fixed remote subscriber units to a respective one of the plurality of group designations based upon the measured pathloss from the fixed base station to such one of the plurality of fixed remote subscriber units;
- assigning a signal transmit power level to each of the plurality of group designations;
- adjusting a transmit power level of a signal transmitted by the fixed base station to one of the fixed remote subscriber units based upon a power level associated with the group to which the one of the fixed remote subscriber unit is assigned; and
- assigning a constellation scaling level to each respective signal transmit power level corresponding to each of the plurality of groups for adjusting each respective signal transmit power level during a downlink data transmission.

* * * * *